G. W. Spear,
Well Tubing,
N°. 53,054. Patented Mar. 6, 1866.
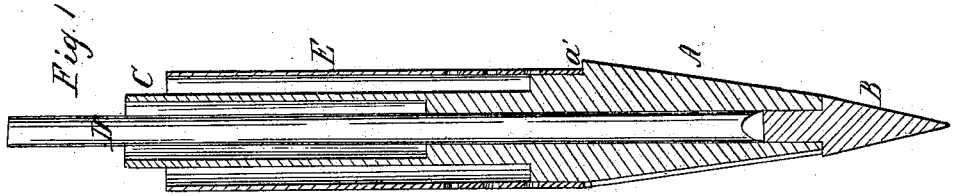
Witnesses.
Theodore Lang
J. S. Peyton.
Inventor
Geo W Spear
by his Attys
Baldwin & Son

UNITED STATES PATENT OFFICE.

GEORGE W. SPEAR, OF NEW YORK, N. Y.

IMPROVEMENT IN WELL-BORING.

Specification forming part of Letters Patent No. 53,054, dated March 6, 1866.

*To all whom it may concern:*

Be it known that I, GEORGE W. SPEAR, of the city, county, and State of New York, have invented a new and useful Improvement in Tools for Boring Artesian Wells, of which the following is a full, clear, and exact description, reference being had to the accompanying drawings, which make part of this specification, and in which—

Figure 1 represents a vertical central section through my improved boring implement; Fig. 2, the reamer and inner tube; Fig. 3, the outer tube; Fig. 4, the drill, and Fig. 5 the point or dibble.

It is the object of my invention to combine in one implement a dibble for penetrating soft soils, a drill to perforate harder strata, and a reamer to enlarge the bore; and to this end my improvement consists, first, in combining an axially-perforated or tubular reamer with a detachable dibble; second, in combining a drill with an axially-perforated or tubular reamer; third, in combining an axially-perforated or tubular reamer with a detachable tubular shaft or shank for working the reamer; fourth, in combining a dibble, an axially-perforated reamer, and a tubular shank or shaft with a ramming-tube for driving down the reamer; fifth, in combining an axially-perforated or tubular reamer, a tubular shank, and a drill with a driving-tube.

In the accompanying drawings, a reamer, A, is shown provided with suitable cutting-edges $a$ on its sides, and with ratchet-planes $a'$ on its upper edge.

The reamer is perforated axially, as shown in Fig. 1, and cut off square at the bottom to form a cutting-edge. A dibble or point, B, screws into the lower part of this perforation as a socket, but can be removed when desired. A tubular shaft, C, is, in like manner, screwed upon the upper end of the reamer. A drill, D, passes down through this shaft, and also through the reamer when the dibble is removed.

A driving-tube, E, of larger diameter than the shank, rests upon the reamer, and its lower end has ratchets $e$, corresponding with those $a'$ on the upper end of the reamer. This tube may also be perforated or slotted, if desired.

In boring with my improved tool the drill is removed and the dibble screwed on. The tool may then be driven down to the rock by striking upon it, or by turning the tubular shank and reamer and boring down. When the rock is reached the tool is withdrawn and the dibble removed. The tool is then again put into the hole and the drill inserted, and the boring continued by reciprocating the drill in the usual way. After the drill has bored a short distance the shank and reamer are turned to enlarge the opening. As the reamer revolves the driving-tube is lifted by the cam-planes or ratchets $a'$ and $e$, and as often as their apices pass each other suddenly dropped upon the reamer with a force due to the weight of the tube and the height of its fall, thus causing the reamer to bite into the stratum.

When the well has been finished the drill is withdrawn and the shank unscrewed, leaving the reamer in the well, as well as the driving-pipe. As the reamer is perforated any fluids below it may pass up into the well and any fluids outside the driving-pipe can flow in through its perforations or slots $i$.

My invention is especially adapted for oil-wells. For instance, the reamer might be carried down a certain depth, and then a hole could be perforated by the drill until oil was struck.

By leaving the tubular shaft C in the well any fluids below the reamer would pass up through the shaft, and any fluids entering above the reamer would flow up around the shaft, but inside the driving-tube.

Moreover, by my invention the well can be deepened at any time without drawing the tubing by adding additional sections and proceeding to bore, as hereinbefore described.

What I claim as my invention, and desire to secure by Letters Patent, is—

1. The combination of an axially-perforated or tubular reamer with a detachable dibble, substantially as and for the purpose described.

2. The combination of a drill with an axially-perforated or tubular reamer, substantially in the manner and for the purpose described.

3. The combination of an axially-perforated or tubular reamer with a detachable tubular shank or shaft, substantially as described.

4. The combination of a dibble, an axially-perforated or tubular reamer, and a tubular shank with a driving-tube.

5. The combination of an axially-perforated or tubular reamer, a detachable tubular shank, and a drill with a driving-tube.

In testimony whereof I have hereunto subscribed my name.

GEORGE W. SPEAR.

Witnesses:
 R. R. LEWIS,
 J. I. PEYTON.